J. W. BROWN, Jr.
CUTTING TOOL.
APPLICATION FILED JUNE 10, 1914.
1,195,774.
Patented Aug. 22, 1916.
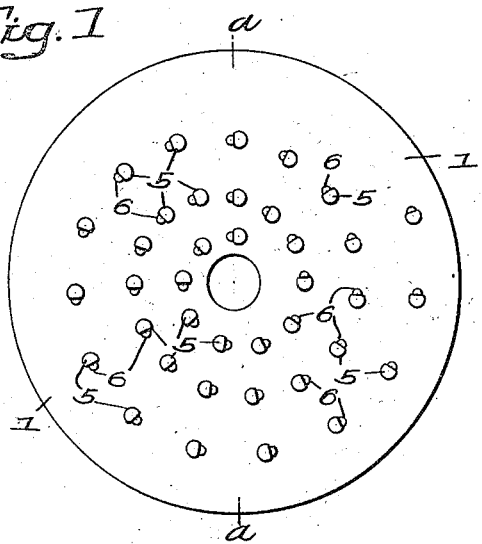
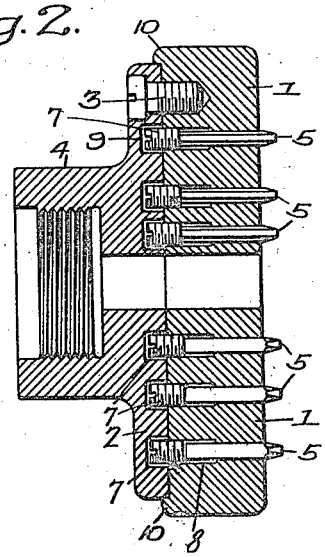
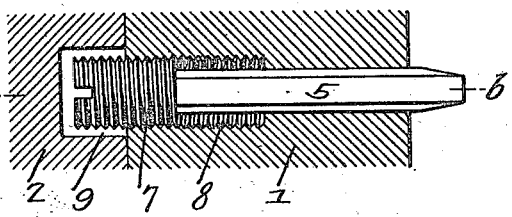
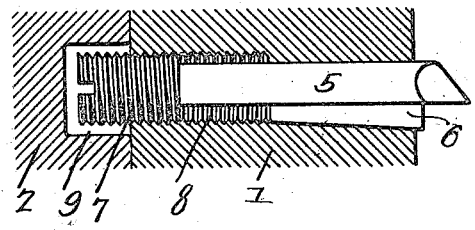
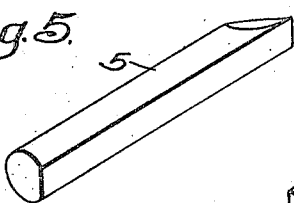
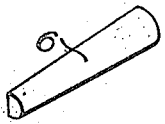
Witnesses
Walter Chism
Willet Burrows
Inventor:
John W. Brown, Jr.
by his Attorneys
Howard Brown

UNITED STATES PATENT OFFICE.

JOHN WILSON BROWN, JR., OF PHILADELPHIA, PENNSYLVANIA.

CUTTING-TOOL.

1,195,774.  Specification of Letters Patent. Patented Aug. 22, 1916.

Application filed June 10, 1914. Serial No. 844,296.

*To all whom it may concern:*

Be it known that I, JOHN W. BROWN, Jr., a citizen of the United States, residing in Philadelphia, Pennsylvania, have invented certain Improvements in Cutting-Tools, of which the following is a specification.

The object of my invention is to provide a simple and effective cutting tool in the form of a disk, so that an extended surface can be cut at each revolution of the tool without subjecting the mechanism to a severe strain. This object I attain by mounting the cutters in a spiral or other pattern on the cutting plate or disk, so that, as the plate rotates, one cutter after another will act upon the material being cut.

In the accompanying drawings:—Figure 1 is a front view of my improved cutting tool; Fig. 2 is a sectional view on the line $a$—$a$, Fig. 1; Fig. 3 is an enlarged sectional view illustrating one of the cutters located in the plate; Fig. 4 is a sectional view on the line $b$—$b$, Fig. 3; Fig. 5 is a perspective view of one of the cutters; and Fig. 6 is a perspective view of one of the wedges used to hold the cutters rigidly in position.

Referring to the drawings 1 is the carrying disk having a series of sockets, preferably arranged in a spiral as shown in Fig. 1. This carrying disk is secured to a plate 2 by screws 3 and has a hub 4 in which is an internal screw thread adapted to the threaded end of the spindle of a lathe or other rotating part. Mounted in each socket is a cutter 5 and a wedge 6. The wedge and the cutter are circular in cross section, with the exception that they have one flattened side, and the flattened side of the wedge rests against the flattened side of the cutter, as clearly shown in Figs. 3 and 4. This makes it possible to form the sockets by drilling two holes, one of a greater diameter than the other. The hole of smaller diameter is drilled on a taper, making the tool very easy to manufacture.

In order to adjust each cutter so that it will project the proper distance beyond the face of the carrying disk, I locate a set screw 7 back of each cutter, as shown in Figs. 2 and 3, and this set screw is adapted to the internal threads in the enlarged holes 8 in the carrying disk so that, by turning the screw, the cutter can have more or less projection. The screws 7, in the present instance, project into cavities 9 in the plate 2, which are preferably larger than the screws 7, or a spiral groove may be formed in the plate 2 to receive the ends of the screws. In some cases, the screws may be so designed that they will not project beyond the carrying disk, thus avoiding the necessity of cavities or grooves in the plate 2.

In order that the carrying disk and the plate may be brought into proper alinement, I preferably provide a flange 10 on the carrying disk, which overlaps the edge of the plate 2, thus taking the strain off the screws 3 and insuring the proper fitting of the parts.

The flattened edge of the cutters provides a cutting face and the end of the cutter is slightly beveled and reduced at the sides so as to give the proper clearance.

As hereinbefore stated, the sockets for the cutters are arranged on a spiral so that one cutter cuts in advance of the one following it, removing a certain amount of material, and the succeeding cutter is so arranged as to overlap the path of the preceding one, thus making a clear and uninterrupted cut. By this construction the strain on the parts of the mechanism and the piece being finished is materially reduced.

Furthermore, articles having ribbed or other uneven surfaces, can be cut with this tool without the liability of shattering the ribs or breaking the cutters, as each cut removes a comparatively small width of material and this material is attached to the main body by practically only two sides.

While I have described the cutters as placed in a spiral and this my preferred form, I do not confine myself to this, but wish to include any tool built up as described whether the cutters are disposed in a spiral or distributed in any other pattern over the surface.

While I have used the words "cutting disk," it will be understood that this disk or plate 1, can be of any shape desired, depending upon the character of the work upon which the tool is to be used and upon the character of the machine to which the invention is to be applied.

I claim:

1. The combination in a metal cutting tool, of a disk arranged to be rotated; a series of cutters projecting at right angles to the surface of said disk and having flat cutting edges arranged on lines parallel with lines radiating from the center and arranged at different distances from the center of rotation and so arranged in respect to each other that a cut will be progressively made.

2. The combination in means for fastening cutters to a carrier, said carrier having a tool socket of an even diameter throughout; an inclined wedge socket at an angle to the socket for the cutter; a tool arranged to fit said socket and having a flat side; a wedge adapted to enter the wedge socket and also having a flat side resting against the flat side of the cutter and arranged to hold the cutter in position in its socket; and means for adjusting the cutter longitudinally.

In testimony whereof, I have signed my name to this specification, in the presence of two subscribing witnesses.

JOHN WILSON BROWN, Jr.

Witnesses:
    Jos. H. Klein,
    Wm. A. Barr.